(12) United States Patent
Miyoshi et al.

(10) Patent No.: US 11,879,833 B2
(45) Date of Patent: Jan. 23, 2024

(54) CIRCULAR DICHROISM MEASUREMENT DEVICE AND CIRCULAR DICHROISM MEASUREMENT METHOD

(71) Applicant: JASCO CORPORATION, Tokyo (JP)

(72) Inventors: Yuichi Miyoshi, Tokyo (JP); Yoshiro Kondo, Tokyo (JP)

(73) Assignee: JASCO CORPORATION, Tokyo (JP)

( * ) Notice: Subject to any disclaimer, the term of this patent is extended or adjusted under 35 U.S.C. 154(b) by 112 days.

(21) Appl. No.: 17/439,480

(22) PCT Filed: Jul. 17, 2019

(86) PCT No.: PCT/JP2019/028138
§ 371 (c)(1),
(2) Date: Sep. 15, 2021

(87) PCT Pub. No.: WO2020/188841
PCT Pub. Date: Sep. 24, 2020

(65) Prior Publication Data
US 2022/0155218 A1   May 19, 2022

(30) Foreign Application Priority Data
Mar. 15, 2019   (JP) .................... 2019-048490

(51) Int. Cl.
  *G01N 21/19*   (2006.01)
  *G01J 4/04*    (2006.01)
  *G01N 21/21*   (2006.01)

(52) U.S. Cl.
  CPC ............. *G01N 21/19* (2013.01); *G01J 4/04* (2013.01); *G01N 2021/216* (2013.01)

(58) Field of Classification Search
  CPC .. G01N 21/19; G01N 2021/216; G01N 21/21; G01N 2021/335; G01N 21/255;
  (Continued)

(56) References Cited

U.S. PATENT DOCUMENTS

| | | | |
|---|---|---|---|
| 5,298,973 | A | 3/1994 | Fukazawa et al. |
| 6,118,536 | A | 9/2000 | Sakamoto et al. |

(Continued)

FOREIGN PATENT DOCUMENTS

| | | |
|---|---|---|
| GB | 1428813 | 3/1976 |
| JP | H05-10821 A | 1/1993 |

(Continued)

OTHER PUBLICATIONS

International Search Report (ISR) issued in International Patent Application No. PCT/JP2019/028138, dated Oct. 8, 2019, with English translation thereof.

(Continued)

*Primary Examiner* — Michael P Stafira
(74) *Attorney, Agent, or Firm* — Greenblum & Bernstein, P.L.C.

(57) ABSTRACT

A circular dichroism measurement device includes: a sample part having a sample; a PEM that modulates a polarization state of an incoming light to the sample part or an outgoing light from the sample part; a photo detector that detects a change in a light intensity of the outgoing light from the sample part; an amplifier that amplifies a detection signal from the photo detector; an A/D converter that converts the detection signal amplified by the amplifier to a digital signal; and a digital processing device that executes a signal processing to the digital signal from the A/D converter to acquire a measurement value of circular dichroism of the sample. The A/D converter is configured to convert the detection signal, that is amplified in a state of containing the AC component and the DC component of the light intensity that changes with the same frequency as the modulation frequency of PEM.

11 Claims, 8 Drawing Sheets

(58) Field of Classification Search
CPC ........... G01N 21/33; G01N 2021/0382; G01N 2030/746; G01N 30/74; G01N 21/23; G01N 2021/218; G01N 21/05; G01N 21/1717; G01N 21/27; G01N 21/3581; G01N 21/64; G01N 33/4833; G01N 2800/245; G01N 33/574; G01N 33/57484; G01N 21/1702; G01N 21/6445; G01N 21/6458; G01N 23/00; G01N 33/566; G01N 2021/0346; G01N 21/03; G01N 21/17; G01N 21/274; G01N 21/68; G01N 21/72; G01N 30/7206; G01N 30/7233; G01N 30/7246; G01N 30/7273; G01N 1/32; G01N 2021/054; G01N 2021/4742; G01N 2021/4769; G01N 2021/8411; G01N 21/253; G01N 21/39; G01N 21/47; G01N 21/49; G01N 21/53; G01N 21/82; G01N 33/44; G01N 33/442; G01N 21/41; G01N 21/74; G01N 30/02; G01N 21/3103; G01N 21/3504; G01N 21/359; G01N 2333/78; G01N 33/532; G01N 33/582; G01N 33/587; G01N 2333/163; G01N 27/447; G01N 33/5014; G01N 33/6896; G01N 33/68; G01N 33/92; G01N 15/02; G01N 15/10; G01N 2015/0038; G01N 2015/0288; G01N 2015/1062; G01N 2015/1081; G01N 2015/1486; G01N 2015/149; G01N 2015/1495; G01N 2015/1497; G01N 2021/6439; G01N 21/0303; G01N 21/636; G01N 21/718; G01N 21/73; G01N 2201/0221; G01N 2201/08; G01N 2201/0813; G01N 2201/084; G01N 2333/12; G01N 2333/35; G01N 2333/445; G01N 2333/4709; G01N 2333/545; G01N 2333/57; G01N 2333/70521; G01N 2333/70585; G01N 2333/96486; G01N 2333/9726; G01N 24/006; G01N 2405/00; G01N 2405/04; G01N 2500/00; G01N 27/44704; G01N 27/44721; G01N 27/44773; G01N 27/44791; G01N 2800/042; G01N 2800/2821; G01N 2800/2835; G01N 2800/56; G01N 33/49; G01N 33/56977; G01N 33/57407; G01N 33/57492; G01N 33/58; G01N 33/683; G01N 33/6854; G01N 33/84; G01N 35/08; G01J 4/04; G01J 3/447; G01J 3/0224; G01J 3/453; G01J 2004/005; G01J 3/42; G01J 4/00; G01J 3/12; G01J 3/28; G01J 3/2803; G01J 3/0208; G01J 3/0237; G01J 3/433; G01J 3/021; G01J 4/02; G01J 3/443; G01J 2003/104; G01J 2003/106; G01J 3/108; G01J 3/2823; G01J 3/02; G01J 3/0216

See application file for complete search history.

(56) References Cited

U.S. PATENT DOCUMENTS

| | | |
|---|---|---|
| 2003/0234937 A1 | 12/2003 | Akao et al. |
| 2013/0169965 A1 | 7/2013 | Sunami et al. |
| 2017/0191928 A1 | 7/2017 | Satozono |

FOREIGN PATENT DOCUMENTS

| | | | | |
|---|---|---|---|---|
| JP | H11-23466 A | | 1/1999 | |
| JP | H1123466 A | * | 1/1999 | |
| JP | 11-51855 | | 2/1999 | |
| JP | 2000206036 A | * | 7/2000 | |
| JP | 2000214088 A | * | 8/2000 | |
| JP | 2001013064 A | * | 1/2001 | |
| JP | 3341928 B2 | | 11/2002 | |
| JP | 3778320 B2 | * | 5/2006 | |
| JP | 2012-202812 A | | 10/2012 | |
| JP | 2014182076 A | * | 9/2014 | ............. B23P 15/26 |
| WO | 94/13199 | | 6/1994 | |
| WO | WO-9908067 A1 | * | 2/1999 | ............. G01J 3/447 |
| WO | WO-2004068119 A1 | * | 8/2004 | ............. G01N 21/19 |
| WO | 2015/186500 A1 | | 12/2015 | |
| WO | WO-2015186500 A1 | * | 12/2015 | ................ G01J 4/04 |
| WO | 2018/115446 | | 6/2018 | |

OTHER PUBLICATIONS

Extended European Search Report Issued in Corresponding EP Patent Application No. 19920558.4, dated Nov. 10, 2022.

* cited by examiner

Block diagram of whole configuration of CD device

CIRCULAR DICHROISM MEASUREMENT DEVICE AND CIRCULAR DICHROISM MEASUREMENT METHOD

RELATED APPLICATION

This application claims the priority of Japanese Patent Application No. 2019-048490 filed on Mar. 15, 2019, the disclosure of which is incorporated herein by reference in its entirety.

TECHNICAL FIELD

The present invention relates to measurement of Circular Dichroism (abbreviated as CD). Specifically, the present invention relates to a circular dichroism measurement device that does not require calibration by a standard sample, and can measure an absolute value of circular dichroism.

BACKGROUND ART

Necessity of calibration with a standard sample in conventional CD measurement devices is briefly described. Going back to the basis of CD measurement, one of the causes of prevention of improvement in sensitivity of CD measurement is that CD is a small value from about $1/100$ to $1/1000$ of absorbance. In conventional CD measurement devices, improvement in sensitivity was achieved to some extent by combining the polarization-modulation method and the lock-in amplification method.

Patent literature 1 (FIG. 5) and Patent literature 2 (FIG. 3) are representative examples of conventional CD measurement devices using the polarization-modulation method and the lock-in amplification method. In these CD measurement devices, the signal path of the alternating-current component (AC component) is branched from the signal path of the direct-current component (DC component). An alternating-current amplifier and the lock-in amplifier are disposed on the signal path of the AC component, and a direct-current amplifier is disposed on the signal path of the DC component. In order to detect a weak AC component from the detection signal, a large gain is set to the lock-in amplifier, and the gains of each amplifier are set independently.

According to the definition of the CD value, the CD value should be able to be calculated based on the ratio of the AC component and the DC component of the detection signal. In the configuration of conventional CD measurement devices, however, even when the ratio of the AC component and the DC component is calculated, a factor that shows an amplifier characteristic remains without being cancelled due to the difference between the gains of each amplifier. One of such causes is that the gain of the lock-in amplifier is extremely large. Accordingly, it was necessary to calibrate the device based on a suitable standard sample, and control the gain to cancel the remaining device factors.

CITATION LIST

Patent Literature

Patent Literature 1: Japanese Unexamined Patent Publication No. H11-23466 A
Patent Literature 2: Japanese Unexamined Patent Publication No. 2012-202812 A

SUMMARY OF INVENTION

Technical Problem

As described above, conventional CD measurement devices require calibration based on a specific standard sample, and reliability of the measurement data depends on reliability of the standard sample. From such circumstance, there has been a demand from users that they wish to omit calibration based on the standard sample in recent years. The object of the present invention is to provide CD measurement device that does not require calibration based on a standard sample.

Solution to Problem

A circular dichroism measurement device of the present invention comprises:
  a sample part having a sample;
  a polarization-modulation means that modulates a polarization state of an incoming light to the sample part or an outgoing light from the sample part;
  a photo detection means that detects a change in a light intensity of the outgoing light from the sample part;
  an amplification means that amplifies a detection signal from the photo detection means;
  an A/D conversion means that converts the detection signal amplified by the amplification means to a digital signal; and
  a digital processing means that performs a signal-processing to the digital signal from the A/D conversion means to acquire a measurement value of circular dichroism of the sample, wherein
  the A/D conversion means is configured to convert the detection signal to the digital signal, the detection signal that is amplified in a state of containing alternating-current component (AC component) and direct-current component (DC component) having the light intensity that changes with the same frequency as a modulation frequency of the polarization-modulation means.

According to this configuration, the detection signal is amplified in a state of containing the alternating-current component (AC component) and the direct-current component (DC component) of the light intensity, and is input to the A/D conversion means. The digital processing means acquires the CD value based on the AC component in the A/D signal and the DC component in the A/D signal extracted from the digital signal. Accordingly, the circular dichroism measurement device of the present invention can measure the CD value without using the lock-in amplifier, i.e., without necessity of calibration based on a specific standard sample.

In the circular dichroism measurement device of the present invention, the digital processing means is preferably configured to:
  extract the AC component (ADsignal(AC)) in A/D signal and the DC component (ADsignal(DC)) in the A/D signal that are contained in the digital signal from the A/D conversion means; and
  acquire the measurement value of circular dichroism of the sample based on a value of a ratio ((ADsignal(AC)/ADsignal(DC))×(g2/g1)) of a value calculated by dividing the AC component in the A/D signal by a system gain (g1) of the measurement device relative to the AC component (ADsignal(AC)/g1) and a value calculated by dividing the DC component in the A/D signal by a system gain (g2) of the measurement device relative to the DC component (ADsignal(DC)/g2).

The system gains (g1, g2) of the measurement device are preferably a gain of the entire system components disposed on a signal path that linearly connects from the photo detection means to the A/D conversion means, and preferably contain at least a gain of the amplification means.

Or, the system gains (g1, g2) of the measurement device are preferably a gain of the entire system components disposed on a signal path that linearly connects from the photo detection means to the A/D conversion means, and preferably contain at least a gain of the photo detection means and a gain of the amplification means.

According to the above configuration, the digital processing means calculates the ratio of the AC component and the DC component of the light to be detected with the value calculated by dividing the AC component in the A/D signal by the system gain (g1) relative to the AC component and the value calculated by dividing the DC component in the A/D signal by the system gain (g2) relative to the DC component to acquire the CD value. Therefore, according to the circular dichroism measurement device of the present invention, the CD value based on a measurement principle that is strictly in accordance with the definition of the CD value can be measured. The CD value measured in such way can be effectively used in evaluation and analysis of a sample as an absolute value.

In the circular dichroism measurement device, the digital processing means is preferably configured to:
  accumulate waveform data for each modulation cycle of the polarization-modulation means contained in the digital signal from the A/D conversion means; and
  extract the AC component in A/D signal and the DC component in the A/D signal based on an accumulated waveform data of one cycle.

According to this configuration, an average waveform can be grasped by accumulating the waveform data for each cycle of polarization modulation, and thus SN of the AC component and the DC component improves.

In the circular dichroism measurement device of the present invention,
  the digital processing means executes fitting to waveform data contained in the digital signal from the A/D conversion means by a superposed wave in which waves from a fundamental wave to an n-th (n is a positive integer) harmonic wave are superposed to extract the AC component in A/D signal and the DC component in the A/D signal.

In the circular dichroism measurement device of the present invention,
  the digital processing means executes an FFT processing to waveform data contained in the digital signal from the A/D conversion means to extract the AC component in A/D signal and the DC component in the A/D signal.

According to these configurations, the digital processing means executes fitting to the digital signal that is subjected to A/D conversion with the superposed wave in which waves from the sinusoidal fundamental wave to the n-th harmonic wave are superposed, or executes a digital processing such as an FFT processing, so that the AC component and the DC component can be extracted with less error.

A circular dichroism measurement method for measuring circular dichroism of a sample based on a polarization-modulation method, the measurement method of the present invention comprises:
  an extraction step, performed by a computer, of extracting an AC component (ADsignal(AC)) and a DC component (ADsignal(DC)) from a digital waveform of a detection signal that is amplified and converted to a digital signal;
  a calculation step, performed by the computer, of calculating a gain of entire system components disposed on a signal path that linearly connects a photo detection means to an A/D conversion means as a system gain (g); and
  a calculation step, performed by the computer, to calculate a measurement value of circular dichroism based on the AC component (ADsignal(AC)), the DC component (ADsignal(DC)), and the system gain (g).

In the calculation step of the system gain (g), the computer preferably calculates the system gain (g1) relative to the AC component of the same frequency as the modulation frequency and the system gain (g2) relative to the DC component to calculate a ratio of the two system gains (g2/g1) as the system gain (g).

According to these methods, the computer can automatically execute CD measurement that does not require calibration, and thus time required for CD measurement can be shortened.

Advantageous Effects of Invention

According to the configuration of the present invention, the detection signal that is amplified in a state of containing the alternating-current component (AC component) and the direct-current component (DC component) of the light intensity is input to the A/D conversion means, and the digital signal processing means calculates the CD value with the gain (g) of the entire system components based on the AC component in the A/D signal and the DC component in the A/D signal extracted from the digital signal. Accordingly, the CD value of the sample can be measured by a measurement method strictly in accordance with the definition of the CD value, without using a lock-in amplifier. The CD value can be measured as an absolute value without necessity of calibration based on a specific standard sample.

DESCRIPTION OF EMBODIMENTS

First Embodiment

Figure 1:
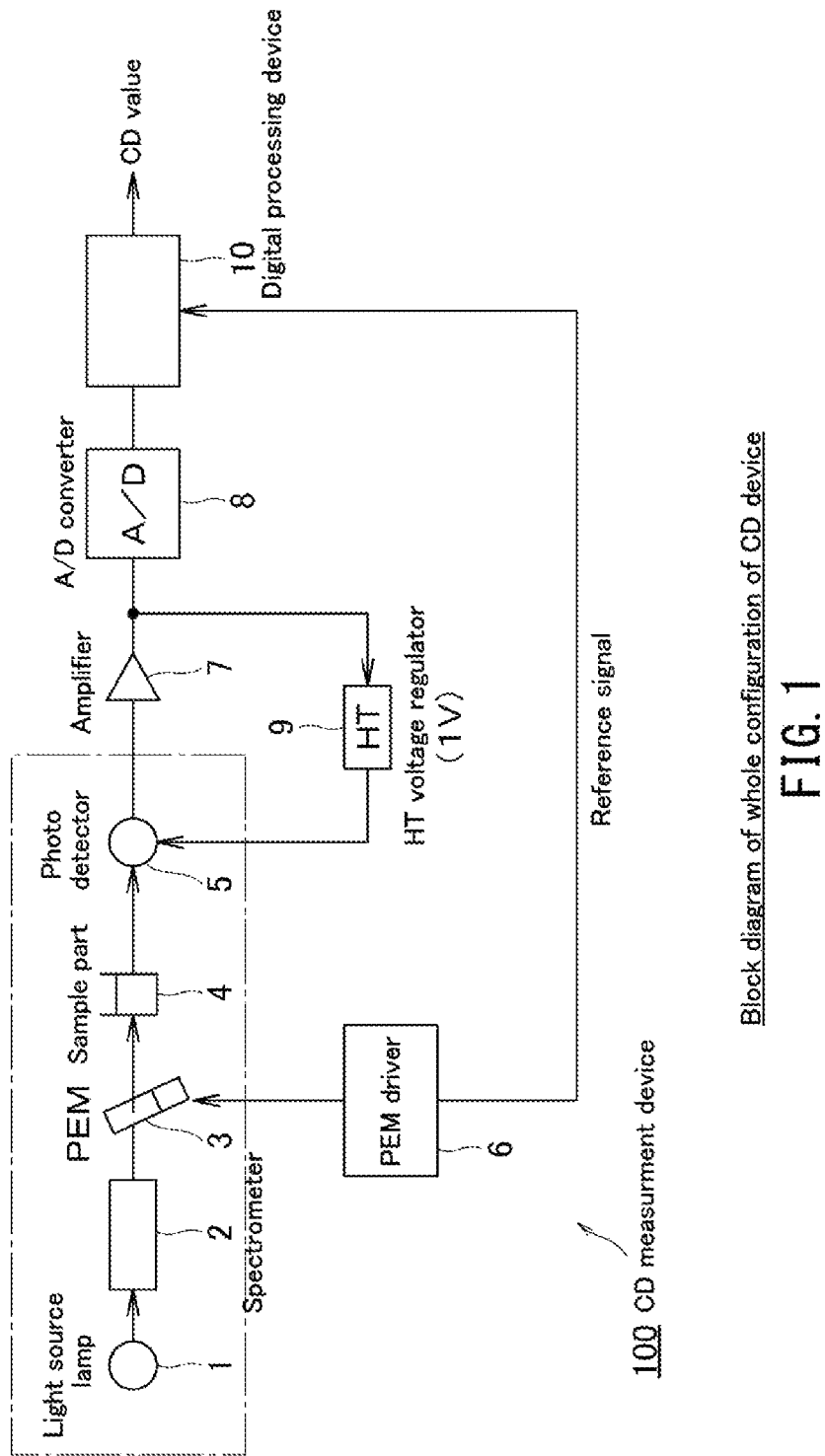
FIG. 1 is a block diagram that depicts a whole configuration of a circular dichroism (CD) measurement device of a first embodiment.

A basic configuration of the circular dichroism (CD) measurement device of the present embodiment is described with reference to FIG. 1. A CD measurement device 100 of FIG. 1 comprises a light source lamp 1, a spectrometer 2, a polarization modulator (PEM) 3, a sample part 4, and a photo detector 5 as measurement optical means, and they are disposed in this order on an optical axis of a measurement light.

The light source lamp 1 is configured with one that corresponds to the range of a measurement wavelength such as xenon lamps and halogen lamps, and emits an irradiation light to a sample. The spectrometer 2 is configured with one selected from various spectrometers using prisms and diffraction gratings, and spectrally disperses the irradiation light from the light source lamp 1 to take out a monochromatic light (a light of a specific bandwidth). The PEM 3 is configured such that an optical element such as synthetic quartz is applied with a stress by piezoelectric elements, and continuously changes the polarization state of the light from the spectrometer 2. The sample part 4 is configured with a sample cell capable of retaining a sample to be measured in accordance with its state (solid, liquid, gas, or mixed state thereof), or flowing the same.

The CD measurement device 100 comprises a PEM driver 6, a signal amplifier 7, an A/D converter 8, an HT voltage regulator 9, and a digital processing device 10 as a signal processing means 20.

The PEM driver 6 supplies a modulation voltage to the PEM 3 for operating polarization-modulation. Accordingly, a linear polarization light contained in the light spectrally dispersed by the spectrometer 2, for example, is imparted with a phase difference when it transmits the PEM 3, and becomes a circular polarization light that changes its rotation left-handed/right-handed in accordance with a cycle determined by a modulation frequency f (it is often 50 kHz in commercially available devices). To be accurate, the polarization state periodically changes by the phase difference to be added $\delta = \delta_0 \cdot \sin 2\pi ft$. Here, the coefficient $\delta_0$ is an amplitude of the phase difference.

The circular polarization light that changes its rotation left-handed/right-handed formed by the PEM 3 transmits the sample of the sample part 4, and then is detected by the photo detector 5. When the sample has circular dichroism, a difference between the absorbance of the left-handed polarization light and the absorbance of the right-handed circular polarization light occurs; therefore, the alternating-current component (AC component) that changes with the modulation frequency f of the PEM 3 is to be contained to the change of the light intensity detected by the photo detector 5.

In the case of a fluorescence-detected circular dichroism (FDCD) measurement device, the photo detector 5 is configured to detect fluorescence emitted from the sample that is excited by left-handed/right-handed circular polarization light.

The light intensity signal detected by the photo detector 5 is amplified with the amplifier 7, and then sent to the A/D converter 8 while containing the direct-current component (DC component) and the AC component. The amplified signal containing both of the DC component and the AC component is quantified by the A/D converter 8, and captured to the digital processing device 10 as a digital signal (A/D signal). In the digital processing device 10, waveform data for each modulation cycle are read out from the A/D signal based on a reference signal from the PEM driver 6 to calculate a measurement value (CD value) of circular dichroism of the sample.

The amplified signal from the amplifier 7 is also sent to the HT voltage regulator 9. This HT voltage regulator 9 comprises a DC feedback circuit and an HT voltage regulation part, not shown in the drawings. The amplified signal from the amplifier 7 is taken into the DC feedback circuit, and the DC component in the amplified signal is compared with a reference voltage of 1 V, for example. Then, the HT voltage regulation part controls a voltage applied to the photo detector 5 such that the output of the DC component in the amplified signal becomes the same as the reference voltage, 1 V, for example. Accordingly, the detection signal can be automatically set to a desired signal level.

Figure 2:
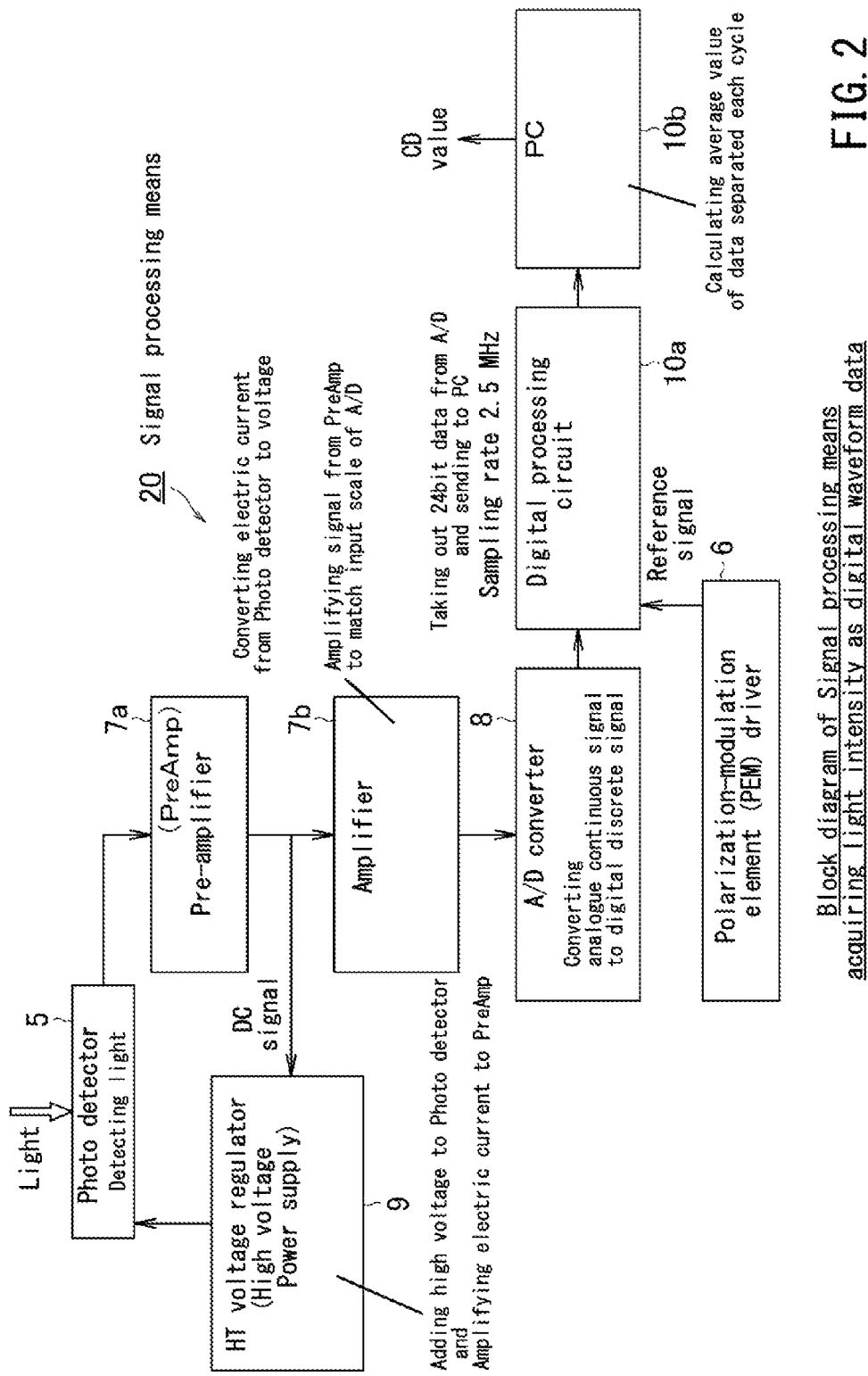
FIG. 2 is an explanation diagram of steps for acquiring a detection signal of a light intensity as a digital waveform data in a signal processing means of the CD measurement device.

FIG. 2 is one example of a specific configuration of the signal processing means 20 of the CD measurement device. Steps for acquiring the detection signal of the light intensity as a digital waveform data are described in details with reference to FIG. 2.

In the present embodiment, the light intensity signal detected by the photo detector 5 is an electric current, and is converted to a voltage by a pre-amplifier 7a. An output voltage of the pre-amplifier 7a is sent to a high-voltage power supply as the HT voltage regulator 9 and the amplifier 7b. A high voltage in accordance with the DC component of the output voltage of the pre-amplifier 7a is applied to the photo detector 5 by the HT voltage regulator 9, so that an input electric current of the pre-amplifier 7a is amplified as a result.

Whereas, in the amplifier 7b, the output voltage of the pre-amplifier 7a is amplified, so that it matches the input scale of the A/D converter 8.

In the A/D converter 8, an analogue continuous signal from the amplifier 7b is quantified to become a digital discrete signal. This digital discrete signal is called as an "A/D signal" herein.

The digital processing circuit 10a is configured with programmable logic devices (such as FPGA), for example. It uses the reference signal of the modulation frequency f from the PEM driver 6 to take out the data of a specific bit number at a specific sampling rate (e.g., 2.5 MHz) from the A/D signal taken in, and sends these data to a computer 10b such as PC. This computer 10b separates the data from the digital processing circuit 10a to waveform data for each cycle of the modulation frequency f, and accumulates these waveform data. Then, the computer 10b calculates an average waveform data of one cycle from the accumulated waveform data, and acquires the measurement value of circular dichroism based on the average waveform data.

Figure 3:
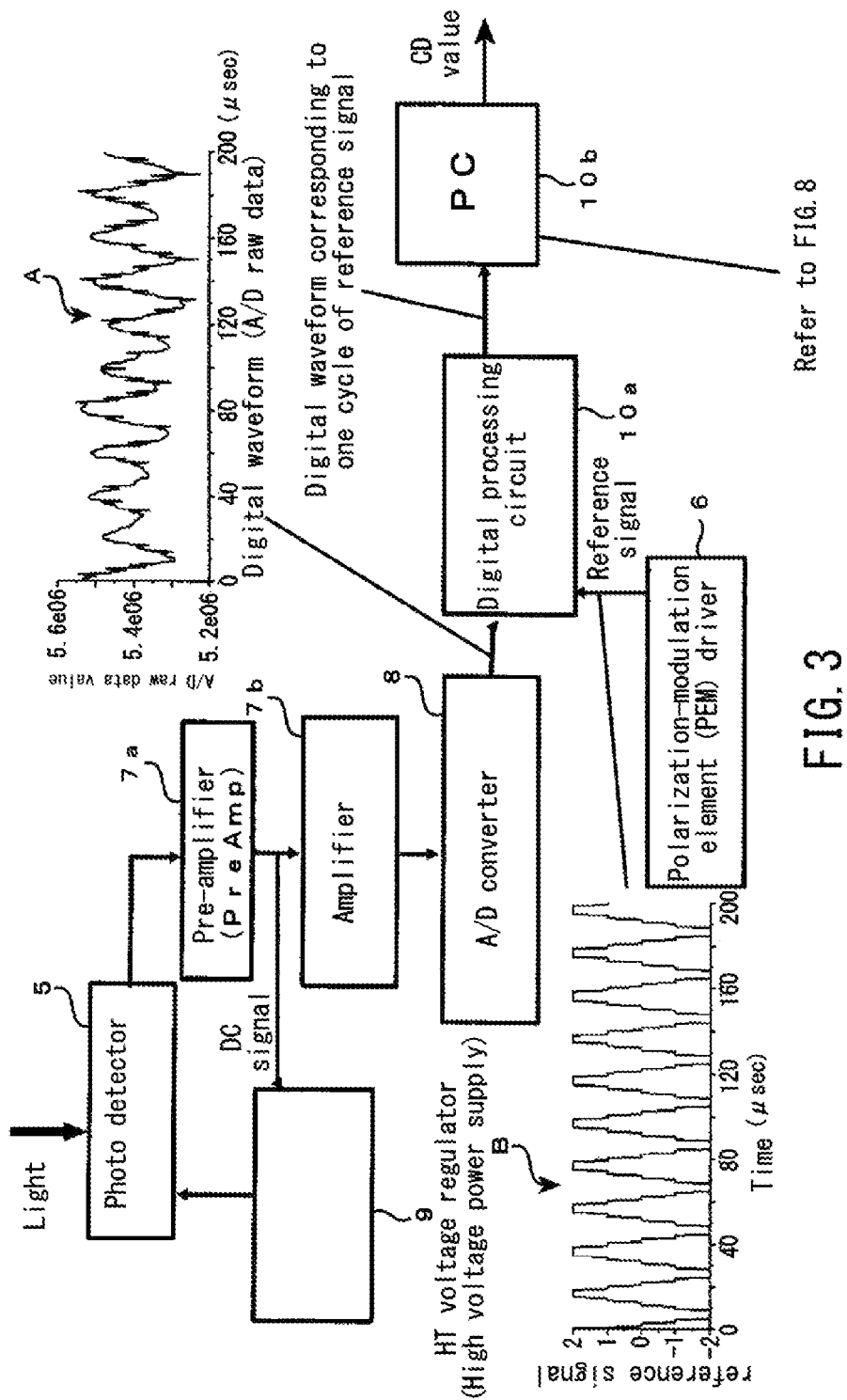
FIG. 3 depicts one example of a waveform data to be processed specifically with the signal processing means.

FIG. 3 shows one example of the waveform data to be processed with the signal processing means 20 in the measurement method of the present embodiment. In the waveform data A at the upper right of FIG. 3, the vertical axis shows a raw data value of the A/D signal from the A/D converter 8, and the horizontal axis shows time (μsec). The DC component and the AC component in the A/D signal can be read out from the continuous waveform data containing noise like the waveform data "A"; however, a method of reading out the DC component and the AC component simply and with high-precision is described herein.

The digital processing circuit 10a samples the A/D signal from the A/D converter 8 at a specific sampling rate (e.g., 2.5 MHz), and separates the sampling data into the waveform data for each cycle of the modulation frequency f based on the reference signal "B" (at the lower left of FIG. 3) of the same frequency as the modulation frequency f of the PEM to send them to the computer 10b. The waveform data for each cycle received by the computer 10b are overwritten and displayed as the waveform data "C" at the right side of FIG. 8 for explanation. The computer 10b accumulates and averages the waveform data for each cycle, and acquires an accumulated waveform data "D" of one cycle as shown at the middle of FIG. 8.

Figure 8:
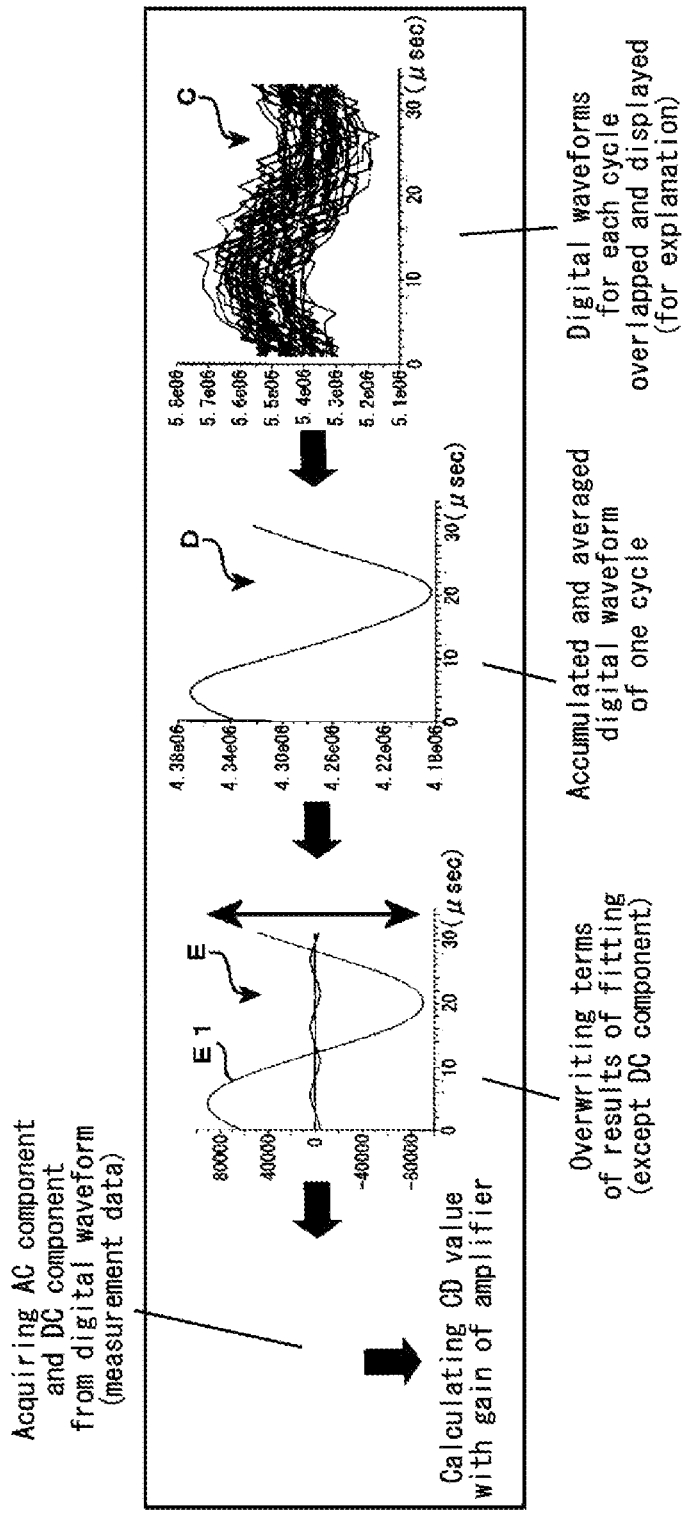
FIG. 8 depicts one example of a waveform data to be processed specifically by the computer of FIG. 3.

The computer 10b further executes a fitting processing to the accumulated waveform data D of FIG. 8. The computer 10b uses a superposed waveform, as a fitting curve, that is made by superposing the waves from the fundamental wave (e.g., sinusoidal wave) to the n-th harmonic waveform. A specific model equation is as follows.

[Math. 1]
$$\sum_{n=1}^{10} a_n \cdot \sin\left\{n \cdot 2 \cdot \frac{\pi}{32} \cdot (X - b_n)\right\} + c \quad (1)$$

The coefficient $a_n$ in Equation (1) is an amplitude of the AC component of the n-th harmonic waveform. For example, the coefficient $a_1$ is an amplitude of the AC component of the primary waveform (50 kHz). The coefficient $b_n$ is a parameter, and the coefficient c is the DC component. The positive integer n is not particularly limited, and n=10 is one example.

The fitting processing is executed to the accumulated waveform data D, and the results are shown in the waveform data "E" at the left side of FIG. 8. The waveform data E is represented by overwriting these terms that represents the AC component of Equation (1). The waveform data "$E_1$" having the largest amplitude corresponds to the primary fundamental waveform. Each coefficient is determined by this fitting. The AC component (50 kHz) contained in the accumulated waveform data D is calculated from the coefficient $a_1$, and the DC component is calculated from the coefficient c.

The computer 10b calculates the measurement value of circular dichroism based on each calculated value of the AC component and the DC component, and the gain (g) of the entire system components.

Figure 4:
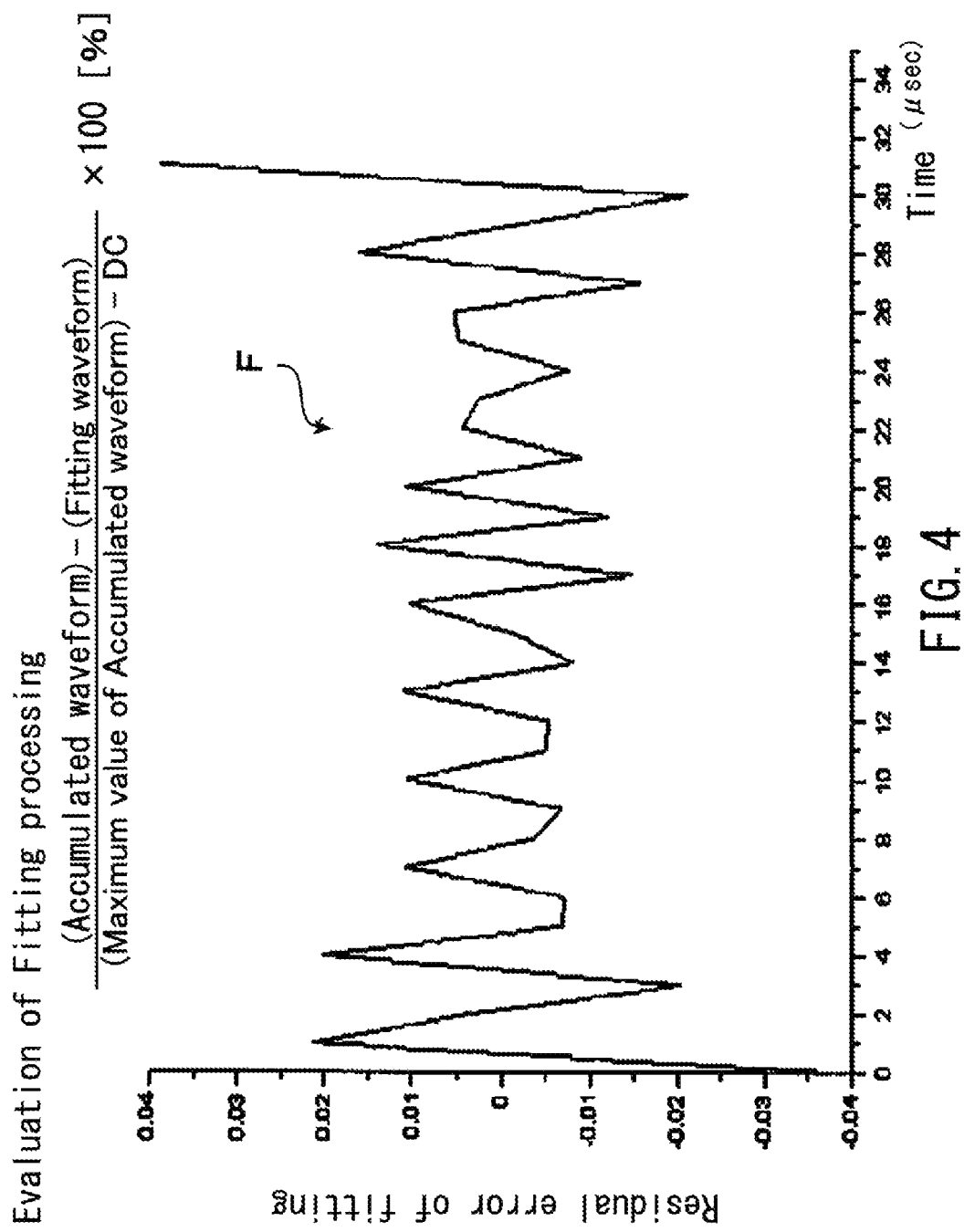
FIG. 4 depicts a result of evaluating a fitting processing in the signal processing means.

The evaluation result of the fitting processing is shown in FIG. 4. As shown in the following equation, the waveform "F" in FIG. 4 is a numerical value calculated by dividing the value calculated by subtracting the waveform data $E_1$ after fitting from the accumulated waveform data D before fitting by the value calculated by subtracting the DC component value from the maximum value of the accumulated waveform data D before fitting, and is expressed by percentage.

[Math. 2]

Residual Error of Fitting =

$$\frac{\left(\begin{array}{c}\text{Accumulated waveform data } D \\ \text{before fitting}\end{array}\right) - \left(\begin{array}{c}\text{Waveform data } E_1 \\ \text{after fitting}\end{array}\right)}{\left(\left(\begin{array}{c}\text{Maximum value} \\ \text{of Accumulated waveform data } D \\ \text{before fitting}\end{array}\right) - \\ \text{(DC component value)}\right)} \times 100(\%) \quad (2)$$

Equation (2) expresses the residual error of fitting. The residual error occurred by the fitting processing of the present embodiment is extremely small. This indicates that reliability of each calculated value of the AC component and the DC component is high.

Although the method of performing fitting for reading out the AC component and the DC component in the A/D signal is shown here, processing methods capable of reading out the AC component and the DC component from the A/D signal, such as an FFT processing, may be adopted instead of fitting.

Correctness of the Measurement Method of the Present Embodiment

Next, it is described based on the mathematical equations that the measurement method of the present embodiment can measure a value strictly in accordance with the definition of the CD value. First, the circular dichroism $\Delta A$ of the sample expressed in accordance with the definition is shown in the following equation.

[Math. 3]
$$\Delta A = A_L - A_R = \log\left(\frac{I_L}{I_0}\right) - \log\left(\frac{I_R}{I_0}\right) = \log\frac{I_L}{I_R} \quad (3)$$

The circular dichroism $\Delta A$ is a difference between the absorbance $A_L$ of the sample relative to the left-handed circular polarization light and the absorbance $A_R$ of the sample relative to the right-handed circular polarization light. As in Equation (3), $\Delta A$ is expressed with a common logarithm of a ratio of the light intensity $I_L$ of the left-handed circular polarization light and the light intensity $I_R$ of the right-handed circular polarization light that transmitted the sample. The light intensity $I_0$ is an intensity of the incoming light to the sample. Since this circular dichroism $\Delta A$ is a dimensionless number, it is usually converted to an ellipticity CD [mdeg] as in the following equation.

[Math. 4]
$$CD[mdeg] = \frac{\ln 10}{4} \cdot \frac{180000}{\pi} \cdot \Delta A \quad (4)$$

Here, when measuring the light intensity $I_L$ of the left-handed circular polarization light and the light intensity $I_R$ of the right-handed circular polarization light shown in Equation (3) based on the polarization-modulation method using PEM, the average value of them $((I_L+I_R)/2)$ corresponds to the "DC component" in the waveform of the light intensity in the polarization-modulation method, and the half of their difference $((I_L-I_R)/2)$ corresponds to the "maximum amplitude of the AC component" in the waveform of the light intensity in the polarization-modulation method. When the model of the first-order Bessel function $J_1(2\pi\delta_0)$ is applied, the waveform of the light intensity I in the polarization-modulation method is expressed as a sum of the term of the DC component and the term of the AC component as in the following equation.

[Math. 5]
$$I = \frac{I_L + I_R}{2} \cdot \left(1 + \frac{I_L - I_R}{I_L + I_R} \cdot 2 \cdot J_1(2\pi\delta_0) \cdot \cos(2\pi\omega_0 t) + \ldots\right) \quad (5)$$

In the mathematical equation, the AC component in the waveform of the light intensity is expressed as "AC", and the DC component is expressed as "DC". By using them, Equation (3) and Equation (4) can be expressed as the following approximate equations.

[Math. 6]
$$\Delta A = \log\left(\frac{I_L}{I_R}\right) \approx \frac{2 \cdot AC}{DC} \cdot \log e \quad (6)$$

[Math. 7]
$$CD[mdeg] = \frac{\ln 10}{4} \cdot \frac{180000}{\pi} \cdot \frac{2 \cdot AC}{DC} \cdot \log e \quad (7)$$

It can be said that the CD value can be measured if the AC component and the DC component can be extracted from the detected waveform data of the light intensity by applying the model equation of Equation (5). However, the actual output waveform from the photo detector (e.g., PMT) is a numerical value multiplied by the gain of the photo detector. When the gain (gdc) of the photo detector relative to the DC component and the gain (g50 kHz) of the photo detector relative to the AC component (50 kHz) are used, the output waveform (Signal) of the photo detector is expressed as the following equation.

[Math. 8]
$$\text{Signal} = \quad (8)$$
$$g_{dc} \cdot \frac{I_L + I_R}{2} \cdot \left\{1 + \frac{g_{50kHz}}{g_{dc}} \cdot \frac{I_L - I_R}{I_L + I_R} \cdot 2 \cdot J_1(2\pi\delta_0) \cdot \cos(2\pi\omega_0 t) + \ldots \right\}$$

Since the photo detector is applied with a dynode feedback and the DC voltage is controlled to be 1 V, the "DC component (Signal(DC))" and the "AC component (Signal(AC))" in Equation (8) of the output waveform of the photo detector is simply expressed as the following equation.

Math. 9

$$\text{Signal}(DC) = g_{dc} \cdot (I_L + I_R)/2 = 1V$$

$$\text{Signal}(AC) = g50\,kHz \cdot (I_L - I_R) \cdot J_1(2\pi\delta_0) \quad (9)$$

The digital waveform data (A/D signal) from the A/D converter is a value multiplied by the gain of the amplifier, and, in addition, is a value affected by the variable coefficient $G_{AD}$ of the A/D converter. When the gain (gdc:Amp) of the amplifier relative to the DC component and the gain (g50 kHz:Amp) of the amplifier relative to the AC component (50 kHz) are used, the DC component (ADsignal(DC)) and the AC component (ADsignal(AC)) of the digital waveform data after A/D conversion are expressed as the following equation.

[Math. 10]
$$ADsignal(DC) = G_{AD} \cdot g_{dc:Amp} \cdot g_{dc} \cdot \frac{I_L + I_R}{2} \quad (10)$$

$$ADsignal(AC) = G_{AD} \cdot g_{50\,kHz:Amp} \cdot g_{50kHZ} \cdot (I_L - I_x) \cdot J_1(2\pi\delta_0)$$

Here, based on Equation (10), when calculating the ratio of the difference $(I_L - I_R)$ and the sum $(I_L + I_R)$ of the intensity $I_L$ of the left-handed circular polarization light and the intensity $I_R$ of the right-handed circular polarization light that are the transmitted lights of the sample, the variable coefficient $G_{AD}$ of the A/D converter becomes cancelled, and it becomes as the following equation.

[Math. 11]
$$\frac{I_L - I_R}{I_L + I_R} = \frac{ADsignal(AC)}{ADsignal(DC)} \cdot \frac{g_{dc}}{g_{50kHz}} \cdot \frac{g_{dc:Amp}}{g_{50\,kHz:Amp}} \cdot \frac{1}{2} \cdot \frac{1}{J_1(2\pi\delta_0)} \quad (11)$$

Here, as a first case, when the CD value based on the ratio of the AC component (Signal(AC)) and the DC component (Signal(DC)) of the output waveform of the photo detector is to be acquired, the ratio of the AC component and the DC component is expressed as the following equation from the above Equation (9).

[Math. 12]
$$\text{Signal}(AC)/\text{Signal}(DC) = (g50\,kHz/gdc) \cdot (I_L - I_R)/(I_L + I_R) \cdot 2 \cdot J_1(2\pi\delta_0) \quad (12)$$

When Equation (11) is substituted to this, the gains (gdc and g50 kHz) of the photo detector become cancelled, and become as the following equation. That is, only the gain g=(gdc:Amp)/(g50 kHz:Amp) of the amplifier remains. The ratio of the AC component and the DC component of the output waveform of the photo detector is regarded as "AC/DC".

[Math. 13]
$$\frac{AC}{DC} = \frac{ADsignal(AC)}{ADsignal(DC)} \cdot \frac{g_{dc:Amp}}{g_{50\,kHZ:Amp}} \quad (13)$$

Equation (4) is expressed as the following equation.

[Math. 14]
$$CD[mdeg] = \frac{\ln 10}{4} \cdot \frac{180000}{\pi} \cdot \frac{2 \cdot AC}{DC} \cdot \log e \quad (14)$$
$$= \frac{\ln 10}{4} \cdot \frac{180000}{\pi} \cdot 2 \cdot \frac{ADsignal(AC)}{ADsignal(DC)} \cdot g \cdot \log e$$

Therefore, it can be said that the ellipticity CD based on Equation (14) can be calculated by measuring the DC component (ADsignal(DC)) and the AC component (ADsignal(AC)) from the output signal of the A/D converter, and measuring the gain g of the amplifier.

As a second case, when the CD value is to be acquired based on the ratio of the AC component (AC) and the DC component (DC) of the light intensity waveform I that enters the photo detector, the ratio of the AC component and the DC component is expressed as the following equation from $AC = (I_L - I_R) \cdot J_1(2\pi\delta_0)$, $DC = (I_L + I_R)/2$.

[Math. 15]
$$AC/DC = (I_L - I_R)/(I_L + I_R) \cdot 2 \cdot J_1(2\pi\delta_0) \quad (15)$$

When Equation (11) is substituted to this, the following equation can be acquired. That is, the gain g=(gdc:Amp·gdc)/(g50 kHz:Amp·g50 kHz) of the photo detector and the amplifier remains. This gain is the gain of the entire system components ranging from the photo detector to the A/D converter, and is called as a "system gain".

[Math. 16]

$$\frac{AC}{DC} = \frac{ADsignal(AC)}{ADsignal(DC)} \cdot \frac{g_{dc:Amp}}{g_{50\,kHZ:Amp}} \cdot \frac{gdc}{g50\,kHz} \quad (16)$$

Equation (4) is expressed as the following equation.

[Math. 17]

$$CD[mdeg] = \frac{\ln 10}{4} \cdot \frac{180000}{\pi} \cdot \frac{2 \cdot AC}{DC} \cdot \log e \quad (17)$$
$$= \frac{\ln 10}{4} \cdot \frac{180000}{\pi} \cdot 2 \cdot \frac{ADsignal(AC)}{ADsignal(DC)} \cdot g \cdot \log e$$

Therefore, it can be said the ellipticity CD strictly in accordance with the definition can be calculated by measuring the DC component (ADsignal(DC)) and the AC component (ADsignal(AC)) from the output signal from the A/D converter, and measuring the gain g of the entire systems ranging from the photo detector to the A/D converter.

Second Embodiment

Figure 5:
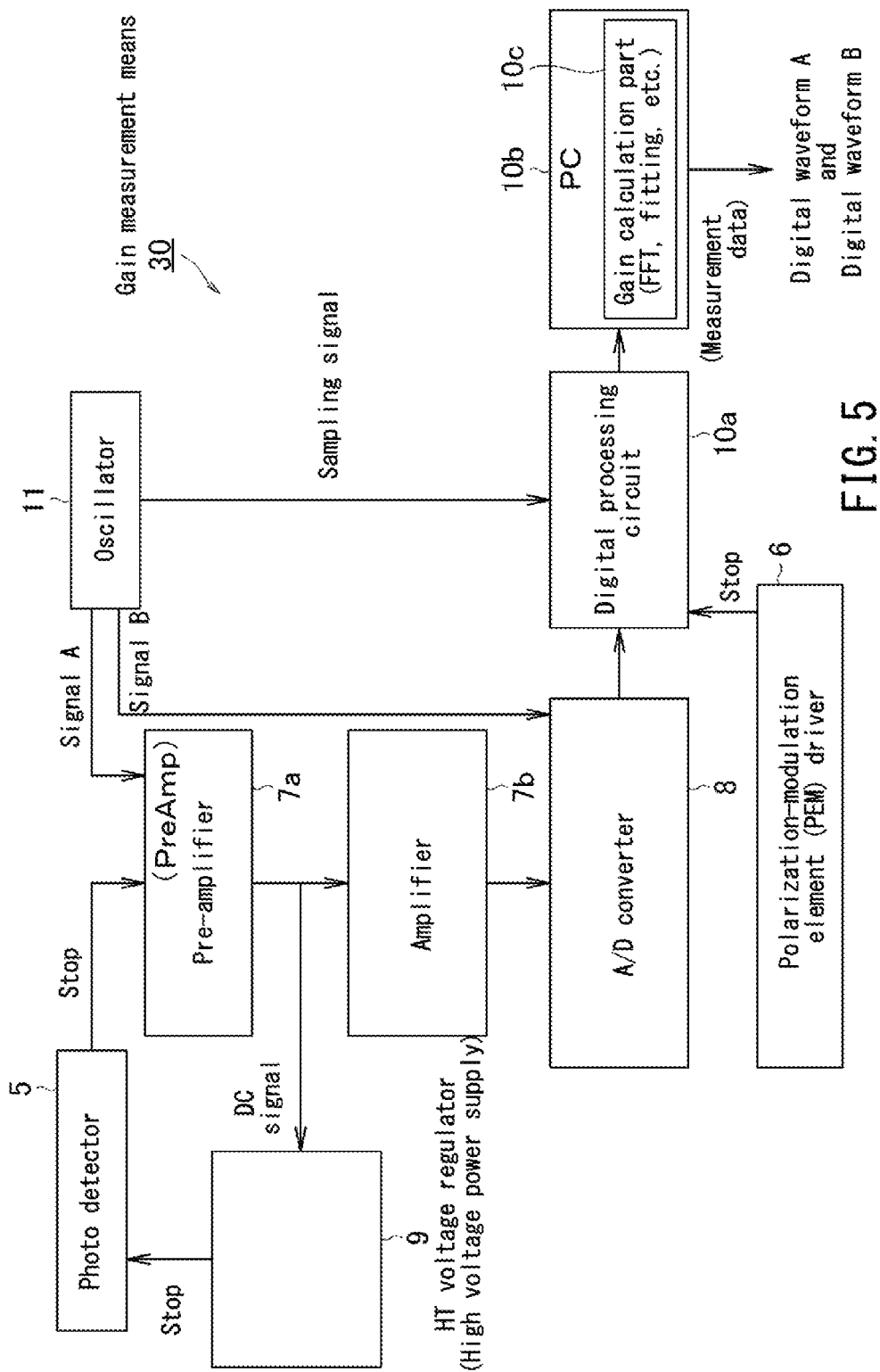
FIG. 5 is a block diagram that depicts a configuration of a gain measurement means of the CD measurement device of a second embodiment.

The CD measurement device of the present embodiment basically has a common configuration as in FIG. 1, and further comprises a gain measurement means 30 having the gain of the amplifier as the target as shown in FIG. 5. The gain measurement means 30 comprises an oscillator 11 and a gain calculation part 10c of the computer 10b.

The oscillator 11 of FIG. 5 is provided to be capable of outputting an oscillation signal A to the pre-amplifier 7a, and is also capable of outputting an oscillation signal B to the A/D converter 8 by switching the output destination. During oscillation, the oscillator 11 sends a signal for sampling to the digital processing circuit 10a. The gain calculation part 10c processes a digital waveform A acquired in response to the signal A and a digital waveform B acquired in response to the signal B, and calculates the gain g of the amplifier.

Figure 6:
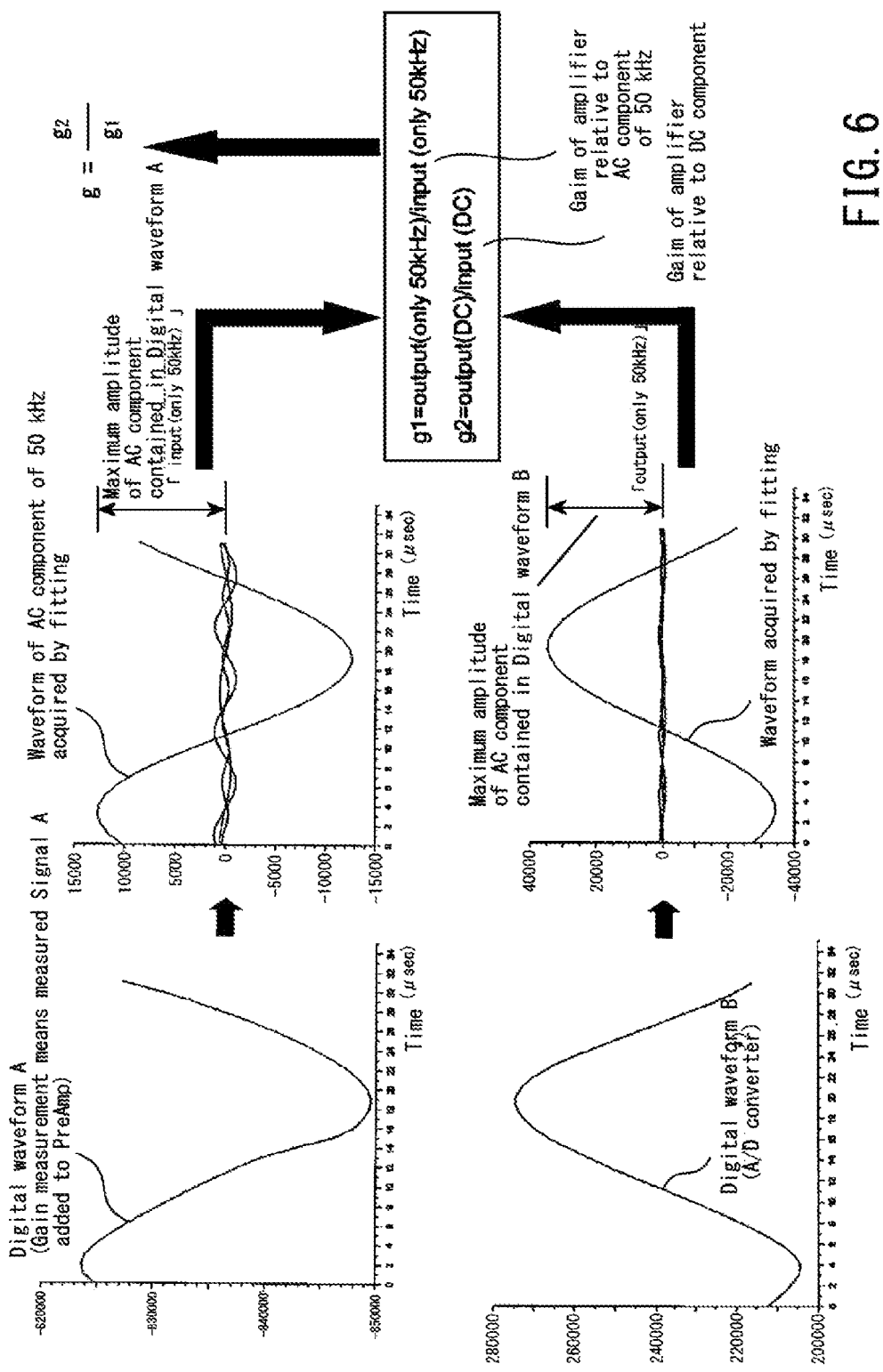
FIG. 6 is an explanation diagram of a gain measurement method of an amplifier performed by the gain measurement means.

FIG. 6 is an explanation diagram of the method for measuring the gain of the amplifier performed by the gain measurement means 30. During measurement of the gain, the photo detector 5 and the PEM driver 6 are stopped. First, the oscillator 11 outputs the signal A (e.g., sinusoidal wave) of the same frequency (e.g., 50 kHz) as the modulation frequency f to the pre-amplifier 7a. The A/D converter 8 outputs the digital waveform data according to the signal A, and the digital processing circuit 10a executes sampling of the digital waveform data with the sampling signal from the oscillator 11. The computer 10b accumulates and averages the waveform data for each cycle. At the upper left of FIG. 6, a digital waveform A that is accumulated and averaged by the computer 10b of when the oscillator 11 added the signal A to the pre-amplifier is shown. The computer 10b further calculates the DC component (input(DC)) and the maximum amplitude of the AC component of 50 kHz (input(only50 kHz)) regarding the digital waveform A by the fitting processing. At the upper middle of FIG. 6, the waveform acquired as the result of the fitting processing is shown.

Next, the oscillator 11 oscillates the signal B to the A/D converter 8. Then, in the same manner, the computer 10b accumulates and averages the waveform data for each cycle based on the sampling data from the digital processing circuit 10a. At the lower left of FIG. 6, the accumulated and averaged digital waveform B of when the signal B is added to the A/D converter 8 is shown. At the lower middle of FIG. 6, the waveform acquired by the fitting processing is shown. The computer 10b calculates, by the fitting processing, the DC component (output(DC)) and the maximum amplitude of the AC component of 50 kHz (output(only50 kHz)) regarding the digital waveform B.

Next, the computer 10b calculates the ratio (g1) of the AC components and the ratio (g2) of the DC components that are calculated according to the respective oscillation signals. The ratio of the AC components is expressed as: g1=output (only50 kHz)/input(only50 kHz), and shows the gain of the amplifier relative to the AC component of 50 kHz. The ratio of the DC components is expressed as: g2=output(DC)/input (DC), and shows the gain of the amplifier relative to the DC component. The computer 10b finally calculates the ratio (g2/g1) of these gains of the amplifier, and outputs or stores the ratio in a storage means as the gain (g) of the amplifier for CD measurement.

Not limited to the use of the gain of the amplifier as described above, a system gain (g) for the entire device systems including the photo detector 5 to the A/D converter 8 (photo detector, various amplifiers, etc.) can be used as the system gain. When this gain of the entire system is to be calculated, a pulse oscillator capable of supplying a light pulse to the photo detector 5 may be used. By providing a calculation part for calculating frequency characteristic to the computer, and digitally-processing the response waveform data of the light pulse, the frequency characteristic of the entire system may be calculated. If the frequency characteristic of the entire system is acquired, the system gain (g1) relative to the AC component and system gain (g2) relative to the DC component of the modulation cycle f can be easily acquired therefrom, and thus the system gain (g2/g1) used for calculating the CD value can be acquired.

Figure 7:
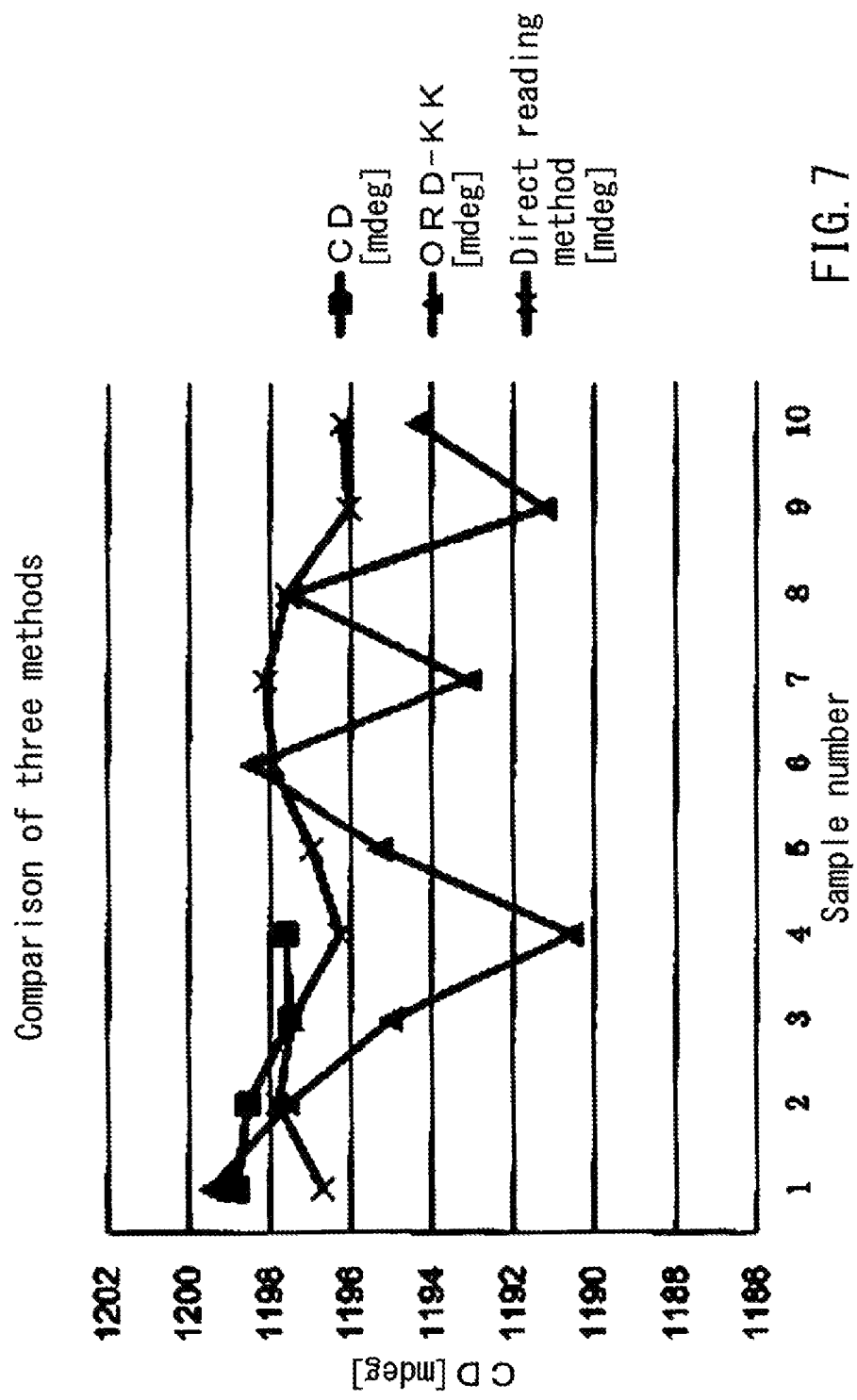
FIG. 7 is a diagram that depicts comparison of deviation of the measurement values acquired by the CD measurement device of FIG. 1 and deviation of the measurement values acquired by a conventional CD measurement device.

FIG. 7 shows the result of comparing deviation of the measurement values acquired by the CD measurement device of FIG. 1 and deviation of the measurement values acquired by the conventional CD measurement device having a Co complex as the measurement target. The vertical axis shows the measurement values of the ellipticity CD, and the horizontal axis shows 10 samples. The comparative data of "CD" in the legend shows the measurement values of a conventional CD measurement device that performed calibration with a conventional standard sample. The measurement was performed for four times. The comparative data of "ORD-KK" is the measurement values acquired by performing KK-transformation to the conventional ORD measurement result. The data of "direct-reading method" is the measurement values of the CD measurement device of the present embodiment, and is a result that directly calculated the ellipticity without calibration. As is evident from FIG. 7, when compared to the measurement results of different methods, the equivalent result was acquired. Therefore, it can be confirmed to be a correct measurement method.

Effects of the CD measurement devices of each embodiment are described.

The CD measurement device 100 of FIG. 1 is configured to amplify the detection signal containing both of the AC component and the DC component of the light intensity that changes at the same frequency as the modulation frequency of PEM (polarization-modulation means) 3 by the same amplifier 7, and convert the amplified detection signal to the digital signal (A/D signal) by the A/D converter 8. Then, in the digital processing device 10, the CD value is acquired based on the AC component and the DC component extracted from the A/D signal. Therefore, according to CD measurement device of the present embodiment, the CD value can be measured without using a lock-in amplifier, i.e., without necessity of calibration based on a specific standard sample.

The digital processing device 10 uses the value calculated by dividing the AC component extracted from the A/D signal by the system gain (g1) relative to the AC component and the value calculated by dividing the DC component extracted from the A/D signal by the system gain (g2) relative to the DC component to calculate the ratio of the AC component and the DC component of the light to be detected and acquire the CD value. Therefore, according to the CD measurement device 100 of the present embodiment, the CD value according to the measurement principle strictly in accordance with the definition of CD measurement can be measured.

Conventionally, there was deviation in the standard of chemical substances used as the standard sample owing to purity, and it was difficult to define the reference value including uncertainty. Whereas, the CD value acquired by the CD measurement method of the present embodiment can be evaluated including uncertainty (error), and is capable of correcting uncertainty. Accordingly, the standard sample can be valued and calibrated.

The signal waveform containing the AC component and the DC component from the photo detector 5 is sent simultaneously to the A/D converter 8 via the same signal path, so that each component is multiplied by the same factor. Accordingly, by calculating the ratio of the components, these factors become cancelled. However, the error depending on the frequency characteristic of the system cannot be eliminated by only calculating the ratio of the components due to the difference between the frequencies of the AC component and the DC component. According to the CD measurement method of the present embodiment, an impulse response is measured by an oscillation signal or a light pulse, so that the gain of the entire system components is measured as the system gain (g). With this system gain (g), the error depending on the frequency characteristic of the system was successfully eliminated.

As a modification of the present embodiment, disposition of the PEM is not limited to the front part of the sample part 4 as in FIG. 1, and it may be disposed on the optical path from the sample part 4 to the photo detector 5. As for the other optical elements other than PEM configuring the measurement optical means, disposition is not limited to that of FIG. 1, and disposition in accordance with measurement conditions may be adopted.

Not limited to CD measurement, the circular dichroism measurement device of the present invention is capable of measuring various polarization dichroism such as linear dichroism (LD), fluorescence-detected dichroism (FDCD), fluorescence-detected linear dichroism (FDLD). The configuration of the measurement device and the measurement method of the present embodiment can be applied to these measurements.

The circular dichroism measurement device of the present invention is not limited to the type shown in FIG. 1 that measures circular dichroism ranging from ultraviolet to near-infrared region, and it can be applied to devices for measuring vibrational circular dichroism (VCD) in infrared region. In VCD measurement, a Michelson interferometer is used as the spectrometer, and an MCT detector suitable for detecting infrared light is used as the photo detector.

REFERENCE SIGNS LIST

3 PEM (polarization-modulation means)
4 Sample part
5 Photo detector (photo detection means)
6 PEM driver
7 Amplifier (amplification means)
8 A/D converter (A/D conversion means)
10 Digital processing device (digital processing means)
10c Gain calculation part
11 Oscillator
20 Signal processing means
30 Gain measurement means
100 CD measurement device

The invention claimed is:

1. A circular dichroism measurement device comprising:
a sample part having a sample;
a polarization-modulator that modulates a polarization state of an incoming light to the sample part or an outgoing light from the sample part;
a photo detector that detects a change in a light intensity of the outgoing light from the sample part;
an amplifier that amplifies a detection signal from the photo detector;
an A/D converter that converts the detection signal amplified by the amplifier to a digital signal; and
a digital processor that performs a signal-processing to the digital signal from the A/D converter to acquire a measurement value of circular dichroism of the sample, wherein
the A/D converter is configured to convert the detection signal to the digital signal, the detection signal that is amplified in a state of containing alternating-current component (AC component) and direct-current component (DC component) having the light intensity that changes with the same frequency as a modulation frequency of the polarization-modulator, and
both the AC component and the DC component are amplified by a same amplifier and are both provided to the A/D converter.

2. The measurement device of claim 1, wherein the digital processor is configured to:
extract the AC component (ADsignal(AC)) in A/D signal and the DC component (ADsignal(DC)) in the A/D signal that are contained in the digital signal from the A/D converter; and
acquire the measurement value of circular dichroism of the sample based on a value of a ratio ((ADsignal(AC)/ADsignal(DC)) x (g2/g1)) of a value calculated by dividing the AC component in the A/D signal by a system gain (g1) of the measurement device relative to the AC component (ADsignal(AC)/g1) and a value calculated by dividing the DC component in the A/D signal by a system gain (g2) of the measurement device relative to the DC component (ADsignal(DC)/g2).

3. The measurement device of claim 2, wherein
the system gains (g1, g2) of the measurement device are a gain of the entire system components disposed on a signal path that linearly connects from the photo detector to the A/D converter, and contain at least a gain of the amplifier.

4. The measurement device of claim 2, wherein
the system gains (g1, g2) of the measurement device are a gain of the entire system components disposed on a signal path that linearly connects from the photo detector to the A/D converter, and contain at least a gain of the photo detector and a gain of the amplifier.

5. The measurement device of claim 1,
wherein the digital processor is configured to:
   accumulate waveform data for each modulation cycle of the polarization-modulator contained in the digital signal from the A/D converter; and
   extract the AC component in A/D signal and the DC component in the A/D signal based on an accumulated waveform data of one cycle.

6. The measurement device of claim 1, wherein the digital processor executes fitting to waveform data contained in the digital signal from the A/D converter by a superposed wave in which waves from a fundamental wave to an n-th (n is a positive integer) harmonic wave are superposed to extract the AC component in A/D signal and the DC component in the A/D signal.

7. The measurement device of claim 1, wherein the digital processor executes an FFT processing to waveform data contained in the digital signal from the A/D converter to extract the AC component in A/D signal and the DC component in the A/D signal.

8. A circular dichroism measurement method for measuring circular dichroism of a sample based on a polarization-modulation method, the measurement method comprising:
   extracting, via a computer, an AC component (ADsignal(AC)) and a DC component (ADsignal(DC)) from a digital waveform of a detection signal that is amplified and converted to a digital signal;
   calculating, via the computer, a gain of entire system components disposed on a signal path that linearly connects a photo detector to an A/D converter as a system gain (g); and
   calculating, via the computer, a measurement value of circular dichroism based on the AC component (ADsignal(AC)), the DC component (ADsignal(DC)), and the system gain (g)
wherein both the AC component and the DC component are amplified by a same amplifier and are both provided to the A/D converter.

9. The measurement method of claim 8, further comprising:
   calculating, via the computer, a system gain (g1) relative to the AC component of the same frequency as a modulation frequency and a system gain (g2) relative to the DC component to calculate a ratio of the two system gains (g2/g1) as the system gain (g).

10. The measurement device of claim 5, wherein
the digital processor executes fitting to waveform data contained in the digital signal from the A/D converter by a superposed wave in which waves from a fundamental wave to an n-th (n is a positive integer) harmonic wave are superposed to extract the AC component in A/D signal and the DC component in the A/D signal.

11. The measurement device of claim 5, wherein
the digital processor executes an FFT processing to waveform data contained in the digital signal from the A/D converter to extract the AC component in A/D signal and the DC component in the A/D signal.

* * * * *